April 25, 1950     C. E. D. VARELA     2,505,509
SYSTEM OF HINGED MEMBERS
Filed Dec. 14, 1946
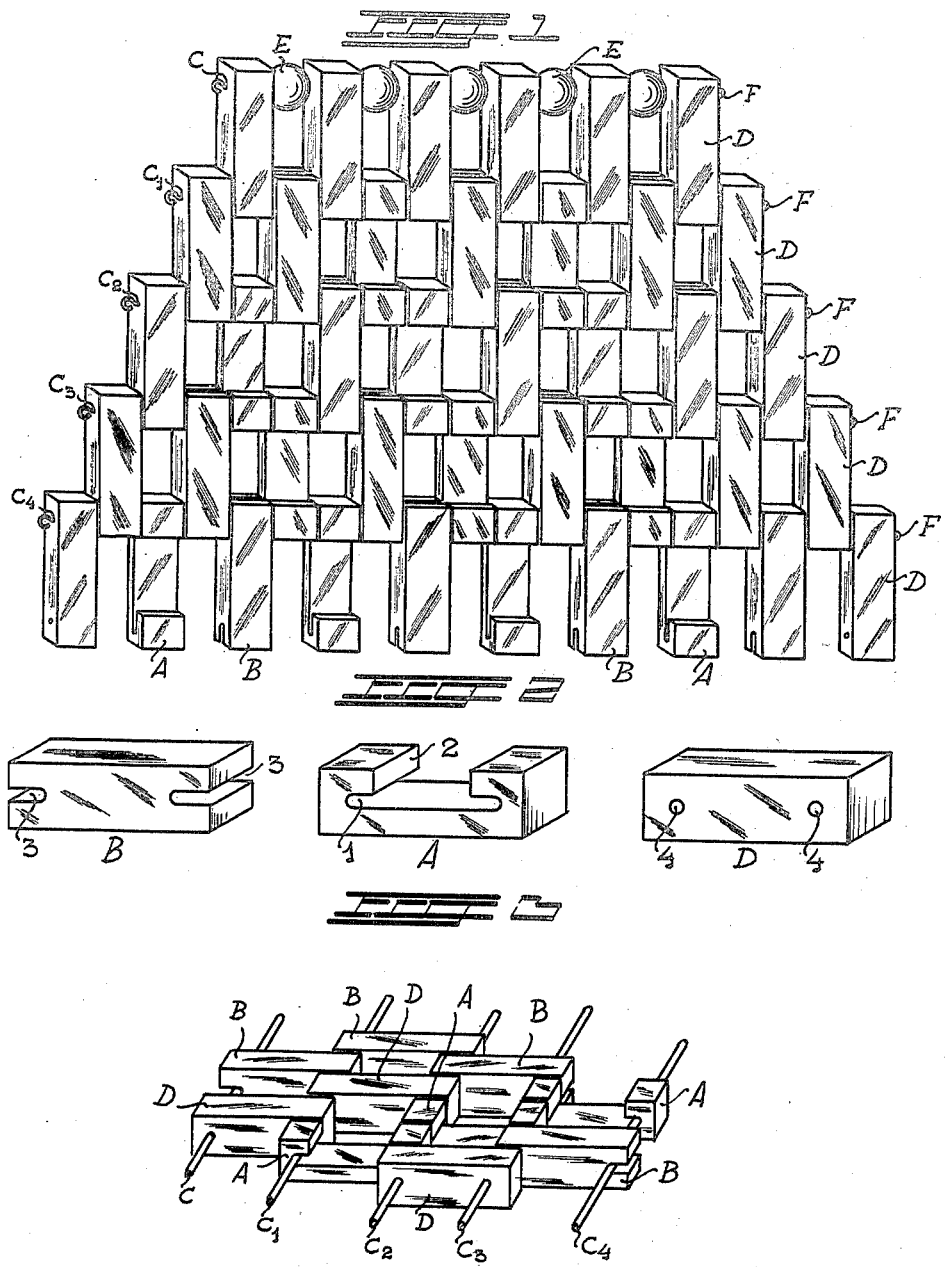
Inventor:
Constantino Enrique David Varela
By C. J. Freeman
Attorney.

Patented Apr. 25, 1950

2,505,509

UNITED STATES PATENT OFFICE 2,505,509

SYSTEM OF HINGED MEMBERS

Constantino Enrique David Varela,
Buenos Aires, Argentina

Application December 14, 1946, Serial No. 716,223
In Argentina May 16, 1946

1 Claim. (Cl. 160—229)

This invention relates to a system of hinged members the assembly whereof constitutes a substantially laminar-shaped formation, capable of being folded, rolled or of assuming any flexion of its plane following the hinging axis of each of the rows of members forming the structure. Structures of the kind referred to are already known in a wide variety of applications such as gratings as used for floors, for use on tables as bases for dishes, as roll blinds for windows or door openings, etc. etc. and in general, they may be used in any case or circumstances where it is desired to have a sheet-like formation having flexible or folding qualities. The material commonly used in the manufacture of these structures is wood, but of course other appropriate materials may be used to advantage, of any kind or nature suitable for the end in view, such as metal, ceramic materials, synthetic resin or similar compounds, rubber and, generally speaking, any material having sufficient mechanical strength for the purpose desired.

The known type of structures of the kind referred to are formed in a general way, of small linear pieces of material, mainly in the shape of small rods of short lengths having bores provided adjacent to both ends, and stringed by said bores in alternate arrangement on hinging axes, usually consisting of rods, wires, cords, or similar means, in such manner that between every pair of adjacent rods directed to one side, there is a rod directed towards the other side, and conversely, other rods of the same shape being added to these in the same arrangement as to form intervals between every two adjacent rods. The rods so arranged constitute thus reciprocally connecting links, forming the laminar or sheet-like assembly having folded and flexible properties.

The present invention has the purpose of providing a sheet-like folding and flexible structure of the general kind referred to previously through the application of a structural innovation tending to facilitate and simplify the operations of manufacture, of assembling the members, and if required, also of taking apart the structure in an entirely novel manner, resulting in the cheapening of the production cost.

The invention is disclosed in the accompanying drawings wherein:

Figure 1 shows a piece of the sheet-like hinged assembly according to the invention;

Figure 2 shows the hinged members forming the sheet-like hinged structure;

Figure 3 discloses some of the hinged members according to the invention, connected in comparatively separated positions, and illustrating the reciprocal interlocking action of the members forming the sheet-like structure.

Referring to the drawings, the sheet-like structure is formed by a number of hook members A, and crotch members B, alternately stringed up on wires or hinging axes C, forming the assembly of the structure, the edge portions whereof are formed by selvage members D having bores at either end of the known type, to lock the reciprocal hookups between the members A and B. At the longitudinal ends of the sheet-like structure, that is to say, considered from the viewpoint of the longitudinal extension of the individual rods or members, the interval between the final members D is filled by filler pieces E which may be, for instance, balls such as shown in Figure 1, or blocks of cylindrical, cubical or parallelepiped shape, such filler pieces being provided with straight-through bores permitting of passage of the hinging axes C. The latter extend with their end portions beyond the selvage members D of the structure, said end portions being bent into rings or eyes; or alternatively, the ends may be simply bent at right angles, or riveted over to form enlarged heads or have any other arrangement preventing the selvage members from coming off which would bring about the falling apart of the whole structure into its component members.

From the details disclosed in Figure 2 it may be observed that the main constituting members A and B forming the two series of members of which the sheet-like structure is built up, have the following characteristics: Member A the general shape of which is that of a small rod or parallelepiped, shows transversely a groove having substantially a T-shaped configuration. The recess forming the cross beam of the T (see reference 1) extends along the longitudinal center plane of member A, and the recess 2 forming the upright post of the T, extending along the transversal center plane of the member A, starts from the first mentioned recess 1 extending and opening through the side of said member which is parallel to recess 1. The member A thus assumes a general shape which is that of a double hook, i. e. a linear member forming reciprocally facing hooks at either end. The member B the general contour whereof is also that of a small rod or parallelepiped, has notches 3 provided at either end, giving the member, as seen from one of its lateral faces, an I-shaped profile. Finally, the selvage members D are provided in the known fashion, adjacent to either end, with the usual bores 4.

The members A, B and D are stringed upon the axes or hinging wires C in such manner that the member A will hook with its recess onto a pair of parallel axes C. Upon one of said axes C, for instance, the axis $C_1$ and another directly adjacent axis $C_2$, a further member A is hooked. Upon one axis $C_2$ and a further axis $C_3$ directly adjacent to the latter, another member A is hooked, and so on. Each member A is thus laterally adjacent to another member A, but set off with regard to the preceding one by the distance of the subsequent pair of axes C (see Figure 3). The members A successively arranged in staggered relation upon the pair of axes $C_1$, $C_2$, $C_3$, etc., are adjacent to each other with the respective lateral faces of their end portions in such manner that the member A hooked up, for instance, with the axes $C_1$ and $C_2$, has the end engaging the axis $C_2$ in sidewise contact with the end engaging the axis $C_2$ of another member A hooked up with the axes $C_2$ and $C_3$; and the end of said other member A engaging the axis $C_3$, is, in turn, in sidewise contact with the end engaging the same axis $C_3$, of a further member A hooked up with the axes $C_3$ and $C_4$, and so on. Between each pair of axes C there is interposed, directly adjacent the members A and alined therewith, a crotched member B, said member B engaging with its endwise notches 3, two parallel adjacent axes, such as $C_1$ and $C_2$, $C_2$ and $C_3$, $C_3$ and $C_4$, etc.; each member B is followed again by a member A, hooked up with two parallel axes, such as $C_1$ and $C_2$, $C_2$ and $C_3$, $C_3$ and $C_4$, etc.; thereafter follows again a member B, and so on, until the desired width of the sheet-like structure is completed. As may be easily gathered, the members 6 hooking up with one pair of axes C, prevent said axes C from coming apart; the members B instead, being interposed between a pair of adjacent axes C, hooked up by the members A, prevent said axes C from approaching one another, thus forming a perfect interlock of the assembly as if the rods were provided only with eyelets or bores. Finally, to definitely lock the assembly in position and prevent the rods or members A and B from falling out, the protruding ends of each pair of adjacent axes, such as $C_1$ and $C_2$, $C_2$ and $C_3$, $C_3$ and $C_4$ and provided thereon with locking rods D of the known type, having simple bores at either end, to the only purpose of engaging each axis C all around and leave no unengaged portion where the axes C might laterally disengage. Axial shifting of the axes C is definitely prevented by bending them off, as disclosed in Figure 1, by means of shaping their ends into rings F, or if desired, by simply turning them over or by forming them into heads by means of enlarged portions, such as may be done by riveting over the ends.

From the preceding description it may be clearly noted that the two pieces or series of members A and B are complemented with regard to each other by their inward and outward notches, respectively, causing on each pair of axes C the same effect as a piece provided with simple bores at either end; in fact, if a member A is laterally juxtaposed to a member B or conversely, it is to be seen that both notches 1 and 3, respectively, are forming with their ends one circular opening, the outer half of which corresponds to the notch 1 of the member A, and the inner half of which corresponds to the notch 3 of the member B. On the other hand, the assembling and taking apart of the laminar structure is rendered most easy, due to the flexibility or elasticity of the axes C, permitting of mutually approaching a pair of axes C for the purpose of inserting them jointly into the recess 2 of the cutout portion of a member A or spreading them apart for the purpose of inserting therebetween a member B by means of the end notches 3 thereof. Finally, as stated above, the selvage members D are applied and the axes C are axially locked by deformation thereof as previously set forth.

The simplification of the manufacturing process is a still more important advantage to be gained by the invention: If, for instance, the members of the laminar structure are to be made of wood, it will be easy to quickly produce in large quantities, laths or strips having the desired profile, such as for instance by means of a jointer or vertical milling machine; such laths or strips may be cut thereafter to the required width in a transverse direction to make the rods forming the hinged members, at a considerably lower investment of time and labor than is required by the manufacture of the members D, due to the necessity of having to drill the end holes thereof individually or through short lengths, on account of the deflection of the drills.

If the members are made of molded material, the formation of the molded strips of the profiles, either of the A or B pattern, is also most easy to effect. The strips are then cut up into rods of the width required for the work desired.

It is true that a certain number of members D will be required, but these are reduced to an insignificant quantity as compared with the major part consisting of members A and B, and furthermore, they may in certain cases be dispensed with by substituting them by other members serving the same purpose, such as for instance metal plates provided with a pair of holes each, wire loops, links, etc.

Having now particularly ascertained and described the nature of my said invention, I hereby declare that what I claim to be of my exclusive property and invention is:

A flexible mat composed of a plurality of equally spaced straight parallel locking rods having distance limiting ends and of three types of parallelepipedal wooden blocks of equal size the first "B" type having longitudinal outwardly opening slots in its two end portions, the second "A" type being bifurcated and having an inner longitudinal slot opening-out towards one side of the blocks and a third "D" type having two bores in its two end portions transversely extending relative to the longitudinal extension of the blocks, rows of said three types of blocks rotatably placed in adjacent relationship upon each of said rods, the first named two types of "A" and "B" blocks alternating with each other and being staggered in their adjacent rows, the marginal rows as well as the lateral end members of each intermediate block rows consisting of the third type of "D" blocks and spherical fillers between the individual blocks of said marginal rows.

CONSTANTINO ENRIQUE DAVID VARELA.

REFERENCES CITED

The following references are of record in the file of this patent:

UNITED STATES PATENTS

| Number | Name | Date |
|---|---|---|
| 617,076 | Buchwalder | Jan. 3, 1899 |
| 900,697 | Bedient | Oct. 13, 1908 |
| 1,160,201 | Ryberg | Nov. 16, 1915 |
| 2,144,683 | McClung et al. | Jan. 24, 1939 |